March 29, 1932.  M. GOSSELIN  1,851,095
FOLDING PHOTOGRAPHIC CAMERA
Filed Oct. 1, 1928   3 Sheets-Sheet 1
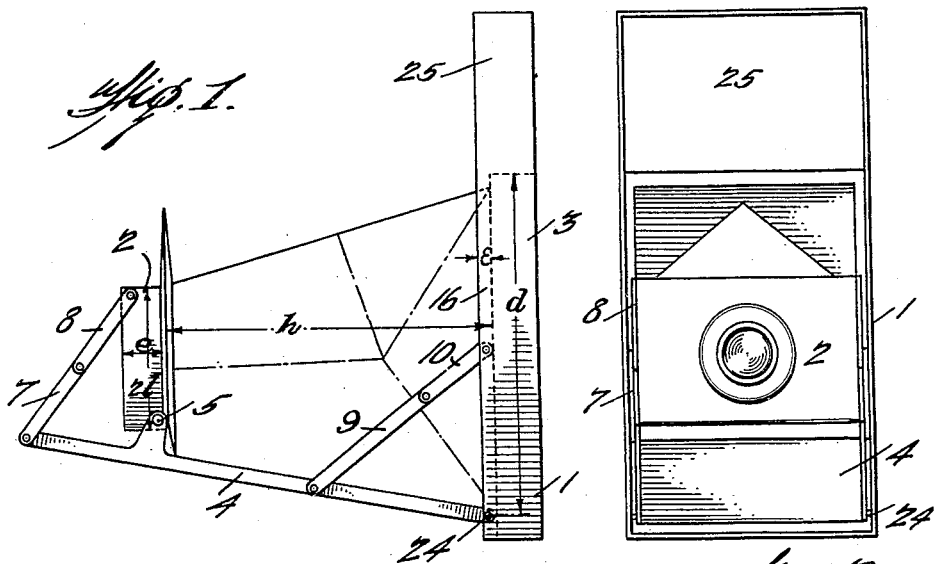
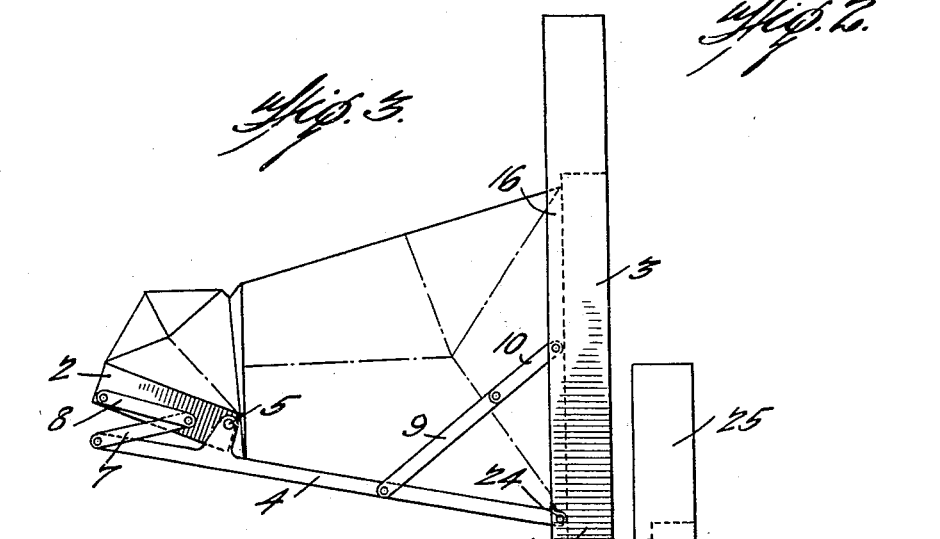
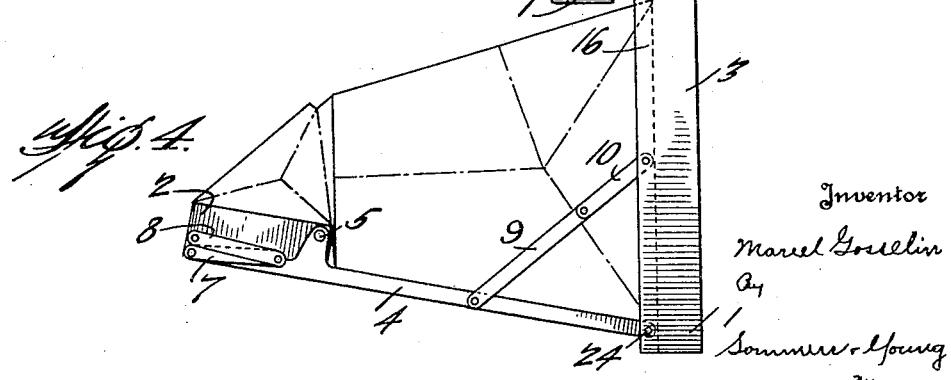
Inventor
Marcel Gosselin
By
Sommers & Young
Attorneys March 29, 1932.  M. GOSSELIN  1,851,095
FOLDING PHOTOGRAPHIC CAMERA
Filed Oct. 1, 1928   3 Sheets-Sheet 2
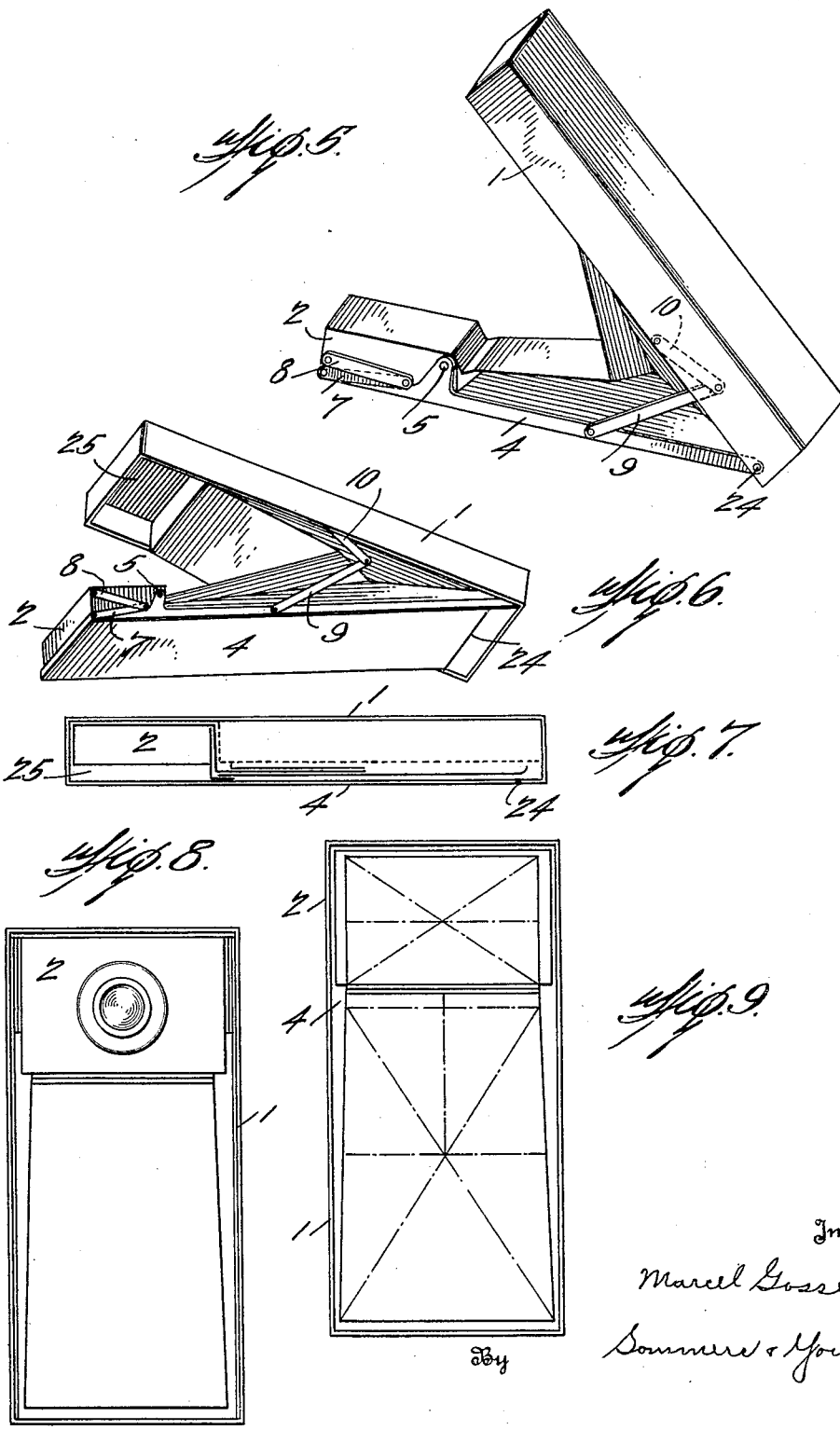
Inventor
Marcel Gosselin
Sommers & Young
By
Attorneys March 29, 1932. M. GOSSELIN 1,851,095
FOLDING PHOTOGRAPHIC CAMERA
Filed Oct. 1, 1928 3 Sheets-Sheet 3

Inventor
Marcel Gosselin
By Sommers & Young
Attorneys

Patented Mar. 29, 1932

1,851,095

UNITED STATES PATENT OFFICE

MARCEL GOSSELIN, OF SOUSSE, TUNIS

FOLDING PHOTOGRAPHIC CAMERA

Application filed October 1, 1928, Serial No. 309,494, and in Germany November 17, 1927.

As is known in the art, folding photographic apparatuses are usually composed of a box and a lens connected together by a bellows. When such an apparatus is closed, the lens is displaced parallel to itself by sliding it along the optical axis thereof, in such a way as to approach the box against which it abuts.

Obviously such an arrangement necessitates considerable bulkiness in thickness when the apparatus is provided with a supply of plates or plane films.

My invention consists in providing a folding photographic apparatus of the type indicated in which a rigid plate carries two pivot shafts on which turn respectively the lens carrying frame and the box of the apparatus containing the supply of plates or films. The position of the two pivot shafts is so arranged that when the lens carrying frame and the box abut against the rigid plate which carries them and constitutes the cover of the box, the lens carrying frame enters a recess provided for that purpose in the upper part of the box. Thus, when the apparatus is closed, its bulkiness is reduced, due to the fact that the thickness of the lens carrier is no longer added to the thickness of the film or plate supply as is the case in apparatus in current use.

The invention further contemplates a constructional embodiment of a bellows which is particularly suitable for use with apparatus of the type indicated, the said bellows being adapted to enter a recess, also provided in the box, when the apparatus is closed.

The invention will be more readily understood by those skilled in the art with reference to the accompanying drawings in connection with the following description.

In the drawings—

Fig. 1 is an elevational side view of the apparatus wide open;

Fig. 2 is a front view of the apparatus in the same position;

Fig. 3 is an elevational side view of the apparatus at the beginning of the folding operation;

Fig. 4 is a similar view with the lens carrying frame in the folded position;

Figs. 5 and 6 are perspective views showing the apparatus in a further state of folding;

Figure 10:
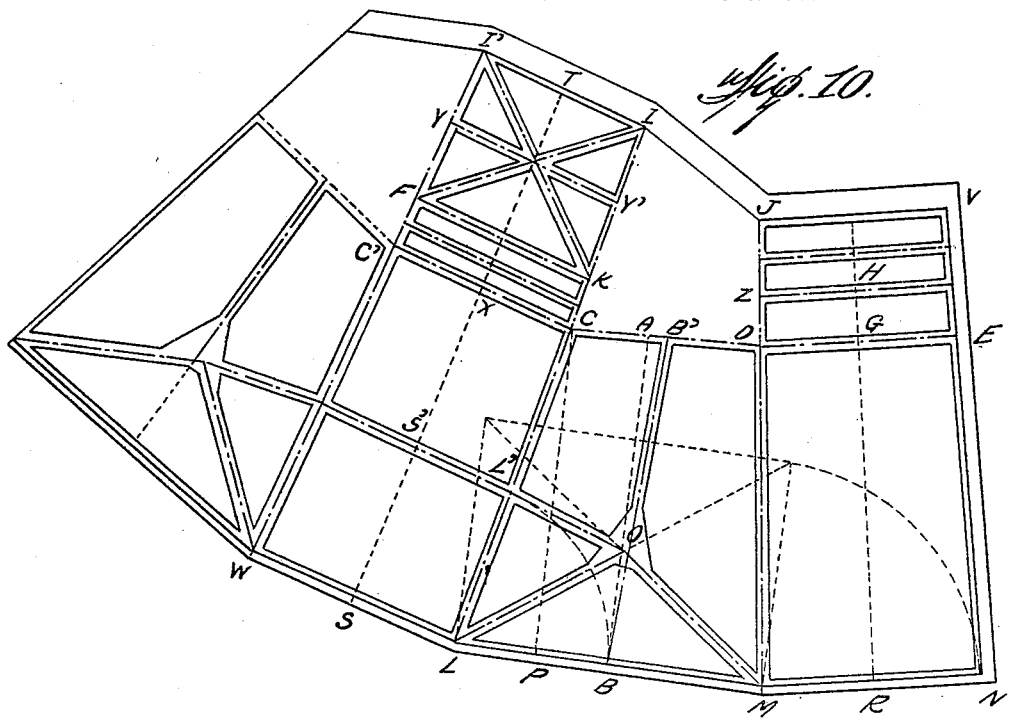
Figure 11:
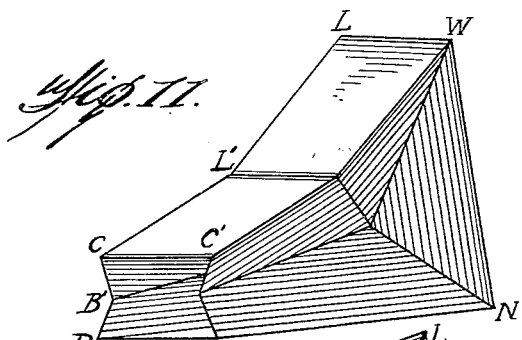
Figure 12:
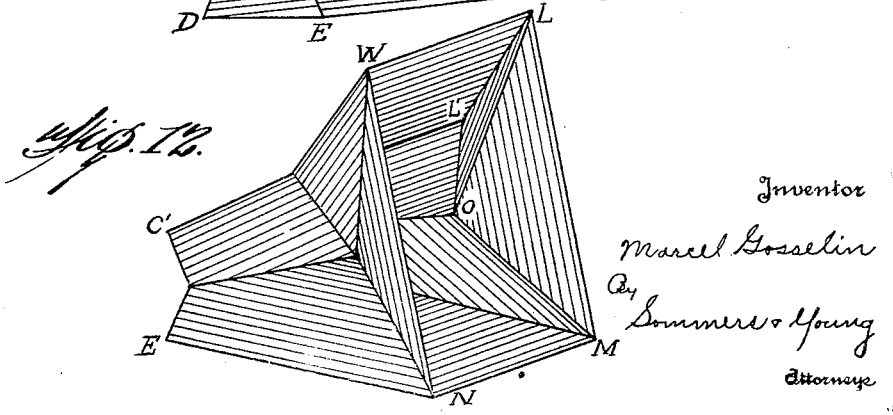

In the two last mentioned figures the creases in the front part of the bellows adjacent the carrying frame have not been shown in detail for the sake of clearness;

Fig. 7 is a diagrammatic view of the apparatus entirely folded showing the position of the bellows;

Fig. 8 is a front view of the folded apparatus, the front plate being supposed to be removed;

Fig. 9 is a corresponding back view with the back plate removed;

Fig. 10 is a development of the bellows;

Figs. 11 and 12 are diagrammatic views showing in perspective the rear part of the bellows in a half folded position.

In all these figures, the creases are indicated by dot and dash lines.

Referring to the drawings more in detail, my apparatus is provided with a rigid plate 4, pivoted at 24 to the box 1 of the apparatus. On said plate is pivoted at 5, the lens carrying frame 2. The box of the apparatus is provided with a space 25 serving as a recess for the lens when the apparatus is folded up. The plate or film is placed in the recess 3 of the box. In the box 1 is likewise provided a space 16 for receiving the folded bellows.

Fig. 1 shows the position which the lens occupies with respect to the case when the box is open. In closing the apparatus, the lens carrying frame 2 is first folded back against the plate by a movement of rotation, as shown in Fig. 3 so as to finally occupy the position of Fig. 4, the whole being then swung about the shaft 24 as shown in Figs. 5 and 6. The elements then occupy the position shown in Figs. 7 to 9 inclusive, the lens carrying frame 2 entering the space 25 provided in the box so that the thickness of the closed apparatus becomes reduced to that of the box itself.

The connections between the rigid plate 4, the lens carrier and the box form no particular part of my invention and may be composed of any of the well known expedients known in the art. Preferably, as shown in Fig. 3, the lens carrying frame and the box are arranged independently and are connected to the rigid plate 4 by means of connecting elements 7, 8, and 9, 10 of well known type, for immobilizing the lens carrying frame and the plate in operative position.

Obviously from the foregoing a special type of bellows must be provided for the apparatus in order that the same may enter the recess 16 provided in the front part of the frame. In Fig. 10 I have illustrated a type of bellows for use with an apparatus of 9 to 12 centimeters in size with a focal length of 142 millimeters. It is to be understood, however, that the bellows may be adapted to any size apparatus. The nature of the following data will allow bellows to be constructed for most any size apparatus.

Adverting to Fig. 1 and 10 for the moment, suppose $a$ and $b$ to represent the dimensions of the sides of the sensitive plate; $h$ the distance of the sensitive plate from the rear of the lens mounting; $2l$ the overall vertical dimension of the lens; $e$ the thickness of the lens; $\epsilon$ the distance from the sensitive plate to the edge of the frame; and $d$ the distance from the axis of rotation of the box to the internal surface of the partition separating the plate chamber from the lens receiving recess with respect to the side provided with that recess.

Adverting to Fig. 10 with these assumptions in view, we have the following relations:

$$CP = h$$
$$MN = a$$
$$LM = b + 5 \text{ mm.}$$
$$BP = l$$
$$CD = 2l + (e - \epsilon)$$
$$DE = a - 8 \text{ mm.}$$
$$KC = HG = (e - 2 \text{ mm.})$$
$$KI = 2l + 6 \text{ mm.}$$
$$IJ = 2l - 3 \text{ mm.}$$
$$MD = d$$

By giving $a$, $b$, $l$, $h$, $e$, $\epsilon$ and $d$ suitable values, all the data necessary for construction of the bellows is complete and the same may be established in the following manner:

A rectangle is first constructed with LM as a base, LM being equal to $b + 5$ mm. and the side perpendicular thereto (shown in dotted lines) being equal to $MN = a$. From the middle B of LM a length equal to $l$ is measured, which gives the point P.

At P a perpendicular is erected on LM and on this line PC is laid off equal to $h$.

From the point C as a center with a radius equal to $CD = 2l + (e - \epsilon)$ an arc is described. From the point M as a center with a radius equal to $MD = d$ a second arc is described. The intersection of the two arcs determines the point D.

On a prolongation of the side LC, CI is laid off equal to $2l + e + 4$ mm.

With the point I as a center and a radius equal to $IJ = 2l - 3$, an arc is described which cuts the prolongation of side MD at J.

The lateral surface I J M L of the bellows is thus established.

With the point M as a center and a radius equal to $MR = a/2$ an arc is described, and from the point D as a center with a radius equal to $DG = a/2 - 4$ mm. a second arc is described and RG is drawn tangent to the two arcs at points R and G.

On a prolongation of the line MR, RN is drawn equal to RM.

On a prolongation of the line DG, GE is drawn equal GD.

From the point J a line is drawn parallel to the side MN which cuts a prolongation of the side NE at V.

The lower surface M N V J of the bellows is thus established.

The upper face L W I' I is easily constructed when it is considered that the part L W C' C is identical to the part M N E D of the lower surface.

To complete the construction it is merely necessary to draw I I' parallel to L W.

The second lateral surface is identical to the surface I J M L and is constructed according to the dimensions thereof.

Construction of plaits

*Lower surface M N V J.*—The plait DE is already established and the plait HZ is parallel to said first plait and at a distance $HG = e - 2$ mm.

The third plait is parallel to the two first ones and situated in the middle of the interval JZ.

*Lateral surfaces.*—The plait B B' joins the middle points B and B' of the sides LM and CD. The point O is determined by the intersection of the diagonals of the parallelogram L M L' M' and establishes the plaits L O and M O.

The plait L' O is determined by $LL' = LB$.

*Upper surface L W I' I.*—The plaits L'S' and C C' are determined from the preceeding constructions. The plait FK is parallel to the preceeding ones and its position is determined by $KC = e - 2$ mm.

The intermediate plait between FK and CC' is parallel to the preceeding ones and is situated in the middle of the interval KC.

The plaits FI and KI' are the diagonals of the trapezium K F I' I. The plait YY' is parallel to II' and passes through the point of intersection of the two diagonals above mentioned.

The plaits are indicated in Fig. 10 by dot and dash lines. The spaces between the plaits are reinforced with thin cardboard as indicated in the figure. The space I J C D must be left flexible.

Having described my invention what I claim as new and desire to secure by Letters Patent is:

1. A photographic apparatus comprising in combination a box provided with a recess in its upper part, a chamber provided in said box below said recess, and adapted to carry the light sensitive elements, a rigid cover plate hinged to the lower front part of said box, a lens carrying frame pivotally mounted on the inner side of said cover plate at a distance from the free end thereof that is substantially equal to the height of said lens carrying frame, said lens carrying frame being adapted to be swung against said free end whereby it may engage the aforesaid recess in the box when the cover plate is swung into the closed position against the front part of the box.

2. A photographic apparatus comprising in combination a box provided with a recess in its upper part, a chamber provided in said box below said recess and adapted to carry the light sensitive elements, a rigid cover plate hinged to the lower front part of said box, means for holding said cover plate in operative position, a lens carrying frame pivotally mounted on the inner side of said cover plate at a distance from the free end thereof substantially equal to the height of said lens carrying frame, said lens carrying frame being adapted to be swung against said free end whereby it may engage the aforesaid recess in the box when the cover plate is swung into the closed position against the front part of the box.

3. A photographic apparatus comprising in combination a box provided with a recess in its upper part, a chamber provided in said box below said recess and adapted to carry the light sensitive elements, a rigid cover plate hinged to the lower front part of said box, means for holding said cover in a given angular relation with respect to said box, a lens carrying frame pivotally mounted on the inner side of said cover plate at a distance from the free end thereof substantially equal to the height of said lens carrying frame, said lens carrying frame being adapted to be swung against said free end whereby it may engage the aforesaid recess in the box when the cover plate is swung into the closed position against the front part of the box, and means for holding said lens carrying frame in an angular relation with respect to said cover plate equal to the above mentioned angular relation of the cover plate with respect to the box, whereby in the open position of the apparatus, the lens carrying frame is parallel to the box.

4. A photographic apparatus of the type described comprising in combination a box provided with a recess in its upper part, a plate chamber provided in said box below said recess, a rigid cover plate hinged to the lower front part of said box, a lens carrying frame pivotally mounted on the inner side of said cover plate at a distance from the free end thereof substantially equal to the height of said lens carrying frame, said lens carrying frame being adapted to be swung against said free end whereby it may engage the aforesaid recess in the box when the cover plate is swung into the closed position against the front part of the box, a bellows interconnecting said box and said lens carrying frame, and a chamber formed in said box in front of the plate chamber.

5. A photographic apparatus comprising in combination a box provided with a recess at its upper part, a plate chamber provided in said box below said recess, a rigid cover plate hinged to the lower front part of said box, means for holding said cover in a given angular relation with respect to said box, a lens carrying frame pivotally mounted on the inner side of said cover plate at a distance from the free end thereof substantially equal to the height of said lens carrying frame, said lens carrying frame being adapted to be swung against said free end whereby it may engage the aforesaid recess in the box when the cover plate is swung into the closed position against the front part of the box, means for holding said lens carrying frame in an angular relation with respect to said cover plate similar to the above mentioned angular relation of the cover plate with respect to the box, whereby in the open position of the apparatus, the lens carrying frame is parallel to the box, a bellows interconnecting said box and said lens carrying frame, and a chamber formed in said box in front of said plate chamber adapted to receive said bellows in the folded position.

6. A photographic apparatus comprising in combination a rigid plate, a lens carrying frame and a box both pivoted on said plate about parallel axes respectively and adapted to be swung against said plate, said box being provided with a shallow recess having the same shape as the lens carrying frame and adapted to receive it when said frame and said box are both swung against the rigid plate, and a bellows for connecting said lens carrying frame to said box.

7. A foldable camera structure comprising two rigid rectangular frames and a bellows connecting them, said bellows consisting of two opposite sides, a top and a bottom, the top being provided with a first transverse crease, three transverse creases close to each other, two diagonal creases connecting the ends of the last of said three creases to the front corners of said top and a transverse crease passing through the point of intersection of said diagonal creases, the bottom being provided with four transverse creases located in the front part thereof and rather close to each other, and the opposite sides being provided each with a wholly flexible part connecting the part of the top extending between the front edge thereof and the first of the three above mentioned adjacent transverse creases in said top to the part of the bottom extending between the front edge thereof and the first of the four above mentioned adjacent creases in said bottom, and with a plaited part comprising a substantially axial longitudinal crease extending from said flexible part to a point located at a certain distance from the rear frame, and three creases extending from said point respectively to the end of the first mentioned transverse crease in the top, and to the top and the bottom corners of the rear frame.

In testimony that I claim the foregoing as my invention, I have signed my name.

MARCEL GOSSELIN.